3,788,808
DYESTUFF COMPOSITIONS CONTAINING SULFO-METHYLATED PHENOLIC-FORMALDEHYDE RESIN DISPERSANTS STABILIZED WITH UREA OR AMMONIA
Sten I. Falkehag, Mount Pleasant, and Carl W. Bailey III, Charleston, S.C., assignors to Westvaco Corporation, New York, N.Y.
No Drawing. Filed Mar. 21, 1972, Ser. No. 236,786
Int. Cl. D06p 1/22, 1/78
U.S. Cl. 8—34      2 Claims

ABSTRACT OF THE DISCLOSURE

Dyestuff compositions for use in dying synthetic and natural fibers, comprising an admixture of a dye cake, e.g., disperse dyes or vat dyes, and up to 75% by weight of the total mixture of a dispersant of a modified phenolic-formaldehyde type resin. The dispersants of this invention are phenolic-formaldehyde resins that are sulfomethylated and contain from 1–13 moles of sulfomethylation per 1000 grams of the starting resin. The dispersants may also be cross-linked to tailor their molecular weight and then stabilized with urea or ammonia. These dye dispersants are light in color, excellent dispersants, produce heat stable dye dispersions, lessen or eliminate fiber staining, diazo dye reduction and foaming problems associated with disperse dyes. These dispersants may also be used in combination with other dye dispersants, such as, sulfonated lignins or sulfonated napthalene products, to optimize the advantageous properties of each dispersant.

BACKGROUND OF THE INVENTION

(1) Field of the invention

This invention relates to modified phenolic-formaldehyde resin dye dispersants and their use with dyestuffs. More particularly, this invention relates to dyestuff compositions containing a water-soluble, sulfomethylated phenolic-formaldehyde resin as the dispersant.

(2) The prior art

Dyestuff compositions comprise, for the most part, a dye cake, i.e., disperse dyes or vat dyes, and include a dispersant. These dyestuff compositions are widely used to color both synthetic and natural fibers. The dye dispersants that may be used to disperse the dye cake vary widely in the method of manufacture and source. In the dyestuff composition the dispersant serves three basic functions. It assists in reducing the dye particles to a fine size, it maintains a dispersing medium, and it is used as an inexpensive diluent. Generally, dye dispersants have been of two major types, sulfonated lignins from the wood pulping industry via the sulfite or kraft processes, and sulfonated napthalene products from the petroleum industry. Both of these dispersant types have found application in one or more areas of dye dispersion; however, each dispersant possesses one or more undesirable properties.

Disadvantages of certain of these dispersants, whether they are sulfonated lignins or sulfonated naphthalene products include one or more of the following; poor heat stability, fiber staining, reduction of diazo-type dyes, dark color and a tendency to stabilize foams. While the first consideration is given to how effectively a product functions as a dispersant, the second is given to stability of the dispersion under heat and pressure. It is this property where many dye dispersants begin to fail. Another disadvantage, fiber staining, of some lignin dispersants occurs mainly on cellulosic and nitrogenous fibers, such as, cotton, nylon and wool, while polyester fibers are also stained but to a lesser extent. Still another disadvantage of some lignin-based dispersants has been that when dyeing with monoazo and diazo-type dispersed dyes under high temperature and pressure dyeing processes, the oxidizable lignin structures tend to reduce the diazo dye linkage. Another disadvantage, the brown color of sulfonated lignin dispersants, is psychological. Lastly, foam stabilization properties of both lignin-based and sulfonated naphthalene dispersants are troublesome for several reasons. First, in ball milling or grinding, in general, foam creates cleaning problems by frothing out of dispersion tanks and by building up foam within ball mills which generally slows the grinding process. Spray drying a liquor with considerable foam causes a fluctuation of the temperature within the dryer. As many dyes are acutely sensitive to heat, this can cause deterioration of these particular dyestuffs. In dye application, foaming in a dye bath results in actual loss of color which floats out of the dye bath with the foam. In printing or thermosol application, air bubbles produce light, undyed spots on piece goods. Particularly troublesome in this regard is the introduction of new dye processing equipment, such as the jet dyer where much turbulence occurs.

The advantages that the modified phenolic-formaldehyde resin dispersants of this invention possess over other dye dispersants include the ability to disperse the dye with at least equal effectiveness, to impart better heat stability to the dye dispersion, have low foam stabilization properties, and light color. Another advantage of the dispersants of this invention is that they tend to act as a dye retarder. Some dyes have a tendency to start dyeing at very low temperatures. Dyers prefer colors to dye a fiber at a steady rate proportional to temperature increase. If the color dyes too rapidly, the material takes on a streaky appearance and creases in the material may dye more rapidly than the face of the cloth. For this reason, sulfonated naphthalene-based dispersants rarely are used alone since they seem to have relatively no retardant properties.

It is therefore the general object of this invention to provide a dyestuff composition containing a sulfomethylated phenolic-formaldehyde resin as a dispersing agent that is capable of reducing dye particles to a fine size, satisfactorily dispersing the dye and overcoming, to a large degree, the undesirable properties of commercially available dispersants. Another object of this invention is to provide a dyestuff composition whose dispersion is stable under heat and pressure. A further object of this invention is to provide a dyestuff composition containing a dispersant which is relatively non-staining. Still a further object of this invention is to provide a dispersant which does not stabilize foam. An even further object of this invention is to provide dye dispersants which will not reduce monoazo and diazo dyes under high temperatures and pressures. Still another object of this invention is to provide a dispersant which is light colored.

Further objects, features and advantages of this invention will be evident from the following disclosure.

SUMMARY OF THE INVENTION

Dyestuff compositions for use in dyeing synthetic and natural fibers comprising an admixture of a dye cake, e.g., disperse dyes and vat dyes, and up to 75% by weight of a dispersant of a modified phenolic formaldehyde resin. The dispersants of this invention are water-soluble phenolic-formaldehyde resins that contain from 1–13 moles of sulfomethylation per 1000 grams of starting resin. The dispersants may also be cross-linked to tailor their molecular weight and stabilized with urea or ammonia. These dispersants may also be used in combination with other dye dispersants, such as, sulfonated liknins and sulfonated naphthalene products, to optimize the advantageous properties of each dispersant. These resin-based dye dispersants are light in color, excellent dispersants, and lessen or eliminate fiber staining, monoazo and diazo dye reduction, and foaming problems.

DETAILED DESCRIPTION OF THE INVENTION

The dispersants of this invention are modified phenolic-formaldehyde resins. The phenolic-formaldehyde resins which are modified to make the dispersants of this invention are, in general, prepared by reacting a phenol and formaldehyde. Besides phenol, other phenolic-type starting materials may be employed, such as cresol, phenol-cresol mixtures, and resorcinol. For the purpose of this specification phenol will be referred to, but it is understood to include any of the hereinabove-mentioned starting materials.

The type of reactions between formaldehyde and a phenol by way of condensation and/or polymerization is substantially different depending upon whether these reactions are effected in the presence of an alkaline catalyst or in the presence of an acid catalyst. Various catalysts can be utilized including both acids and bases. Alkaline catalysts commonly used for catalyzing the phenol-formaldehyde reaction are the oxides and hydroxides of alkaline earths and alkali metals, ammonia, and amines such as ethanolamine. Acid catalysts commonly used include mineral and organic acids, for example, oxalic acid or acetic acid.

When an alkaline catalyst, such as sodium hydroxide, calcium hydroxide, barium hydroxide and others, are employed, the initial reaction consists primarily in the production of methylol substituents on the benzene ring of the phenol, and the reaction product initially produced is soluble in water and in organic solvents. The reaction product in this condition is referred to as an "A-stage resin." Such alkaline catalyzed products are generally referred to as "resoles." The A-stage resole is soluble in aqueous alkaline solutions. The A-stage resole is the preferred starting resin for preparation of the sulfomethylated phenolic-formaldehyde dispersants of this invention. Further reaction results in polymerization of the methylol phenols to form a product that is insoluble in alkaline solution, and the reaction product in this condition is commonly referred to as being in the "B-stage." Further polymerization at elevated temperatures results in the conversion of the B-stage resin into te thermoset condition in which it normally occurs in manufatured products, this condition being generally referred to as the "C-stage."

As distinguished from the resoles produced by alkaline catalyzed reaction between formaldehyde and a phenol, the presence of an acid catalyst results in a different reaction mechanism, resulting in more highly polymerized reaction products which are commonly referred to in the art as "novolaks." Such novolaks do not possess the solubility in water of the resoles, and are generally uitilized by effecting a cure in the presence of a substantial quantity of a curing agent, such as hexamethylene tetramine. In order to use a novolak resin as the starting resin to make the dispersants of this invention, it is adjusted to an alkaline pH.

In a preferred practice of this invention, a phenol and aldehyde mixture are heated in the presence of a catalytic amount of sodium hydroxide and brought to the A-stage. It is conventional in the preparation of the resin to commingle a phenol with an aqueous solution of formaldehyde in the molar ratio desired. For the alkaline catalyzed resins, such molar ratio ratio usually is in the order of 1.0 moles to about 3 moles of formaldehyde per mole of phenol, preferably 1.3–1.8 moles of formaldehyde per mole of phenol, and for preparing the resole conventional practice is to employ an aqueous formaldehyde solution containing approximately 37% of formaldehyde, paraformaldehyde, or other comparable aldehydes. About 0.1% to 15% by weight of sodium hydroxide or other alkaline catalyst is added to the composition for promoting the reaction for forming the A-stage resin. The reaction of phenol and formaldehyde takes place by heating at a temperature between 70° C. and 170° C. for ½ to 6 hours. By virtue of the water initially included in the reaction mixture and that which is formed during reaction, an A-stage resole as initially produced usually contains approximately 50% solids. It is to be noted that during this heating some cross-linking will occur with the production of water. Solids content of the starting resin as used herein, denotes the weight of the cross-linked resin obtaintable from the resole solution as a percentage of the total weight of the resole solution.

The phenol-formaldehyde resole is modified by adding to it sulfomethylation solubilizing groups. By the term "sulfomethylation" as used herein; it is meant either the sulfonation with sodium sulfite of a hydroxy methyl phenol, or phenolic resin with hydroxy methane sulfonate. The term "sulfomethylation" also includes obtaining the sulfonation by sulfur dioxide.

When the phenolic-formaldehyde resins are reacted with the solubilizing group, sulfomethyl groups are introduced into the resin. The amount of sulfomethylated groups may vary from about 1 up to about 13 moles of sulfomethylation per 1000 grams of resin; however, generally only 1 to 6 moles of sulfomethylation is added to get the desired water solubility. It is thought that sulfomethylation occurs in the ortho- or para-position of the phenolic ring.

To sulfomethylate, the phenolic-formaldehyde resin is preferably reacted with formaldehyde or paraformaldehyde or the like and the alkali metal salts of sulfurous acid in an alkaline medium under a wide variety of reaction conditions. Thus the temperature of the aqueous medium in which the reaction is carried out may be varied considerably. The temperatures need only be sufficient to bring about the introduction of methylol or sulfomethylol groups into the resin. Generally, temperatures between about 30° C. to 130° C. may be used although temperatures between 90–95° C. are preferred. Lower temperatures require longer reaction times and in order to complete the reaction within a reasonable time, i.e., 2 to 8 hours, preferably 4 hours, the preferred temperatures are used. Examples of alkali metal salts of sulfurous acid which are useful in this invention include sodium sulfite, potassium sulfite, sodium bisulfite, potassium bisulfite, sodium metabisulfite, potassium metabisulfite and the like. The alkali metal sulfite and bisulfites contain one mole of combined $SO_2$ for each mole of the sulfite. The alkali metal metabisulfites, on the other hand, contain 2 moles of combined $SO_2$ for each mole of the metabisulfite. Accordingly, only one-half molecular proportion of alkali metal metabisulfite is required to a given amount of combined $SO_2$ equivalent to the combined $SO_2$ in one molecular proportion of alkali metal sulfites or bisulfites. The preferred alkali metal salts of sulfurous acid, for the purposes of this invention, are sodium sulfite and sodium metabisulfite.

The amount of the alkali metal salt of sulfurous acid, for example, sodium sulfite, used in relation to the aromatic ring residues in the resin determines the water-solubility of the reaction product formed, it being understood, of course, that formaldehyde is also used with such salt, as described above. Although strictly speaking the formaldehyde and alkali metal salt of sulfurous acid both influence the water-solubility of the final product under acid conditions, the alkali metal salt through introduction of sulfonate groups and the formaldehyde through the formation of methylol groups, the alkali metal salt of sulfurous acid exerts the primary solubilizing influence. The degree of solubility in water of the final product may the alkali metal salt of sulfurous acid with relation to the be varied widely by proper selection of the proportions of aromatic ring residues in the resole. Thus, it is possible to use the sulfurous acid salt in an amount sufficient to provide from 0.5 to 2.0 moles of combined $SO_2$ for each aromatic ring residue (for example, phenol residue) in resin when products having high solubility in water are desired. By decreasing the proportion of the alkali metal salt of sulfurous acid with relation to the aromatic ring residues in the resin, the water-solubility of the product decreases and its salt sensitivity increases. Thus, if the sulfurous acid salt is used in amounts sufficient to provide from about 0.15 to 0.90 mole of combined $SO_2$ for each aromatic ring residue in the resin, excellent dispersing agents are obtained. These agents have sufficient water-solubility to be soluble in water which is acidic, neutral and alkaline. If the mole ratio of combined $SO_2$ in the sulfurous acid salt to aromatic ring residues in the resin is appreciably below 0.1, the products are substantially insoluble in neutral or acidic aqueous media.

The molecular proportions of formaldehyde, either as formalin, or as paraformaldehyde, and the alkali metal salt of sulfurous acid may be varied widely with relation to each other and also with relation to the aromatic ring residues in the resin depending on the properties desired in the dispersant. For most purposes, the mole ratio of formaldehyde to the alkali metal salt of sufurous acid is preferably at least one mole of formaldehyde for each mole of combined $SO_2$ in the alkali metal salt. If less formaldehyde is used, an excess of the alkali metal salt of sulfurous acid remains in the reaction mixtures and does not take part in the reaction. Hence, the solids concentration of the reaction mixture is increased without any corresponding benefit. Moreover, if the reaction mixture is acidified at the end of the reaction, as is usually the case, more acid is required to neutralize the reaction mixture. Consequently, more salt is formed and the solids content of the final product is increased without any corresponding benefit in the properties of the end product. When it is desired to cross-link the resin to the maximum possible extent, it is possible to increase the amount of formaldehyde substantially. In such a case, the mole ratio of formaldehyde to combined $CO_2$ in the alkali metal salt of sulfurous acid may be as high as 25:1.

The pH of the reaction mixture will vary considerably depending on the particular alkali metal salt of sulfurous acid used. Thus, with sodium sulfite the pH will be higher initially than in the case where sodium bisulfite of sodium metabisulfite is used. Moreover, since sodium hydroxide is liberated during the reaction when sodium sulfite is used and is not liberated in those instances when sodium bisulfite or sodium metabisulfite is employed, the reaction mixture at the completion of the reaction will have a higher pH when sodium sulfite is used. The alkalinity of the reaction mixture is normally derived from the alkali metal salt of the sulfurous acid and it is not necessary to add alkali for this purpose, especially when the amount of the alkali metal salt of sulfurous acid used is sufficient to neutralize the acidity of the resin and the formalin solution. If the amount of the alkali metal salt of sulfurous acid employed is not sufficient for such neutralization a small amount of an alkali metal hydroxide is added to make the reaction mixture slightly alkaline. When sodium sulfite is used, the sulfomethylated phenolic-formaldehyde resin generally has a final pH of between 9.5 and 12.0.

Since free formaldehyde and methylol groups are present, at least during the initial stages of the sulfomethylation reaction, a certain amount of cross-linking of the resin takes place resulting in increased molecular weight. In dye dispersants, increased molecular weight is desirable up to a point to produce desirable dispersant properties. Additional amounts of formaldehyde, say 0.2 to 1.0 mole of formaldehyde per 1000 grams of sulfomethylated resin, may be used to effect cross-linking. Also heating, at say 90° C. for 1–3 hours promotes formaldehyde cross-linking which does not block the phenolic hydroxyl. Formaldehyde, for instance, is an effective cross-linking agent; whereas, epichlorohydrin is less effective. It should also be pointed out that too high a molecular weight, i.e., over 30,000, of the sulfomethylated resin is undesirable. For the purposes of this specification the term "low molecular weight" refers to dispersants having a molecular weight less than 500; and "high molecular weight" refers to dispersant having molecular weight more than 15,000. Dispersants having a molecular weight between 2,000 and 20,000 are preferred.

After sulfomethylation of the resin and cross-linking is effected to the desired level, an alkaline mixture or solution is obtained which may be used as such or neutralized with an acid or made acidic. If the solution is neutralized or made acidic, it is preferably cooled prior to the addition of acid to avoid high temperatures caused by the heat of neutralization of alkali in the mixture. In the preparation of the dispersants of this invention, the final solution is made acidic with a mineral acid, such as sulfuric acid preferably together with an organic acid, such as glycolic acid or acetic acid, as a buffering agent. In such instances the final pH of the solution is preferably adjusted between about 6 and 8. When a minimum amount of water is used in the reaction mixture, the final solution is quite viscous. Such solutions may be diluted with water to increase their pumpability either before or after they are neutralized.

It may be desirable to react the sulfomethylated, cross-linked, phenolic-formaldehyde resin with urea or ammonia. This reaction allows a greater amount of sulfomethylation to be effective by deactivating unreacted methylol groups, while still maintaining good heat stability. Generally, 0.5 to 7.5 moles of ammonia or urea per 1000 grams of cross-linked, sulfomethylated resin is used at a temperature between 80° C. and 150° C. for from 5 minutes to one hour.

When products which are soluble in water under acid conditions are desired, it is important to use sufficient water in the reaction mixture to dissolve all of the reagents and the final product, otherwise the reaction does not proceed as rapidly as is desired and various difficulties are encountered. When the final solution is to be shipped, it is usually desirable to use the minimum amount of water in the reaction mixture.

Sulfomethylated phenolic-formaldehyde resins made and treated as described above are excellent cross-linked dispersants for disperse and vat dyes. These disperstants are light colored, they do not stabilize foam and they do not stain fibers. These dispersants also aid in the rapid grinding of the dyes and provide heat stability to an aqueous solution of the dispersed dyestuffs under boil.

In another aspect of this invention it has been found that when the above-described dispersants of this invention are mixed with up to 95% sulfonated lignin and/or naphthylene based dispersants a synergistic effect with regard to properties of the dispersed dyestuff seems to exist.

In order to clearly illustrate the advantages in physical properties obtained by the dispersants of this invention they were tested for dispersing ability, heat stability, fiber staining, foaming and diazo dye reduction. The tests were conducted according to the test procedures outlined below.

The test for determining heat stability at elevated temperatures comprised weighing out 3 grams of the disperse dyestuff (outlined in the diazo dye reduction test) into a beaker and addding 40 milliliters of water. A uniform paste was made and 60 milliliters of boiling water was added to the paste. The material was heated to boil and stirred for 15 minutes while at the boiling point. This was poured through a Buckner funnel containing a tared 9.0 cm., No. 4 Whatman filter paper with vacuum. The filter paper containing funnel was rinsed with 30 milliliters of water at 120–140° F. The filter paper was dried, weighed and the residual dye material determined therefrom.

The diazo dye reduction test was performed by charging a pressure bomb with 500 mg. of C.I. 21000 (Disperse Brown 1 dye), 200 cc. water, and 20 grams of dispersant. The mixture was thoroughly stirred and the pH adjusted to between 5 and 6 with acetic acid. A 10 gram Dacron skein was placed in the dye mixture; the bomb sealed and heated to 130° C. for 90 minutes. After cooling, the skein was removed from the bomb, washed and dried. The reduction in color was compared by visual observation but may, if desired, be determined by analysis of the residual solution with a spectrometer.

The test for determining extent of fiber staining caused by the sulfomethylated resin dispersants was to weigh out 10 grams of the resin based surfactant and dissolve it in 300 milliliters of tap water. Adjust the pH to 9.0 with acetic acid. Add a 5 gram nylon fiber skein and heat to a boil. Boil the mixture for 15 minutes, wash the skein with tap water and dry in an oven at 105° C.

The test for determining foaming properties of disperse dye surfactants was to weigh out 1 gram of surfactant and dissolve in 100 milliliters of tap water. Adjust to pH 9.5 with acetic acid and pour into a 250 milliliter graduated cylinder. The cylinder is inverted 5 times (over and back=1 inversion) and immediately after completing the 15 inversions and again after 1 minute and 2 minutes have elapsed the level of foam in milliliters is recorded. If the foam disappears within the 2 minute period, the time at which all the foam vanished was recorded. The solution is returned to a beaker after all the foam has broken (or 2 minutes) and the pH lowered to 7.0 with acetic acid and again perform the inversion and recording part of the test.

The practice of the invention may clearly be seen in the following examples.

EXAMPLE 1

This example illustrates a preferred process for making the sulfomethylated phenolic-formaldehyde resin dispersants of this invention.

A resole resin was prepared by condensing 1 to 1.3 molar portions of phenol to formaldehyde in the presence of a sodium hydroxide catalyst. The reaction was carried out until the resin reached the A-stage. The A-stage resin had a solids content of 59.4% and a pH of 8.8 with a major portion of the resin having a molecular weight of between 300 and 1800.

To a one gallon reactor kettle, 1512 grams of the resin were charged. To this was added 600 grams of reagent grade $Na_2SO_3$, 1200 grams water and 372 grams of 37% formaldehyde. The contents were continuously stirred and heated to 90–95° C. for 4 hours to effect sulfomethylation. The pH of this reaction, 10 minutes after heating was discontinued, was 10.3. The pH was lowered to 8.5 with 236 grams of acetic acid.

The sulfomethylated resin was then reacted by boiling 25 minutes with 18.0 grams of urea and further lowering the pH to 6.0 with 155 grams of acetic acid. The material was cooled to 120° F. and collected for testing as a dye dispersant. The final solution was light colored.

The following example evaluates the sulfomethylated resins of this invention which were prepared according to the general procedures of Example 1, except showing the effects of the variables involved.

EXAMPLE 2

This example illustrates the advantages of the dispersants of this invention having varying degrees of sulfomethylation incorporated into a dispersed dyestuff. A number of runs were made in which the properties of the various dispersions were compared. In this example the dispersants were made according to the general procedure of Example 1 except that sulfomethylation was varied from 1 to 13 moles per 1000 grams of starting resole.

A standard diazo disperse dye solution was prepared by mixing 5 grams of C.I. 21000 (Disperse Brown 1) in one liter of distilled water. The sulfomethylated resole resins having varying moles of sulfomethylation (from 2 moles to 13 moles) were added to the standard dye solution and the dispersing ability, fiber staining, foaming and diazo dye reduction properties and heat stability evaluated.

The procedures for determining each property are set out hereinabove. The results are shown in Table I below.

TABLE I

| Run | Moles reactant/ 1,000 grams resole | Heat stability | Fiber staining [a] | Foaming test, ml. of foam, pH 7 [b] | | |
|---|---|---|---|---|---|---|
| | | | | Initial | 1 min. | 2 min. |
| 1 | None | (c) | | | | |
| 2 | 2 | .0053 | 1 | 55 | 20 | 10 |
| 3 | 3 | .1602 | 1 | 50 | 15 | 10 |
| 4 | 4 | .4378 | 1 | 55 | 45 | 25 |
| 5 | 5 | .6893 | 2 | 60 | 10 | 8 |
| 6 | 13 | .4130 | 1 | 10 | (8) | |

[a] 1=Little or no fiber staining, 5=severe fiber staining.
[b] Parentheses number represent seconds required for the foam to break.
[c] Not soluble.

The products from runs 2–3 formed excellent dispersion, while runs 4–6 were fair. The diazo dye reduction for each dispersant shows only slight dye reduction. These results show that the degree of sulfomethylation can be varied greatly to tailor properties of the dispersants. The results show that heat stability of the disperse dye stuff against tarring decreases and the degree of sulfomethylation of the dispersant increases. Also, foaming is lowered as sulfomethylation increases.

EXAMPLE 3

This example illustrates the effect on physical properties by increasing the molecular weight of a sulfomethylated resin by cross-linking with formaldehyde. A resin sulfomethylated with 4 moles sulfomethylation per 1000 grams of starting resin was cross-linked with varying amounts of formaldehyde for 90 minutes at 90° C.

The dispersants were tested with the standard diazo dye solution outlined in Example 2 and the various properties are shown in Table II.

TABLE II

| Run No. | Mole cross-linking agent/1,000 grams resin | Dispersion test | Heat stability | Foaming, ml. of foam, pH 7.0 [d] | | |
|---|---|---|---|---|---|---|
| | | | | Initial | 1 min. | 2 min |
| 7 | [a] 0.2 | Exc | 0.3896 | 50 | (35) | |
| 8 | [a] 0.5 | Exc | 0.3650 | 40 | (20) | |
| 9 | [a] 0.8 | Exc | 0.0218 | 35 | 30 | 25 |
| 10 | [c] 1.0 | Exc | 0.0611 | 20 | (5) | |
| 11 | [b] 0.5 | Exc | 0.6113 | 30 | 5 | (35) |

[a] Formaldehyde, 90° C. for 90 minutes.
[b] Epichlorohydrin, 90° C. for 30 minutes.
[c] Formaldehyde cross-linked of 3.5 hours at 95° C.—high molecular weight.
[d] Numbers in parentheses represent seconds required for foam break.

The results show that an increase in molecular weight aids foaming properties and heat stability. However, the molecular weight should preferably be increased by cross-linking agents which do not block the phenolic hydroxyl group as does epichlorohydrin in run 11. Further, too high a molecular weight, i.e., above about 30,000, is not desirable.

EXAMPLE 4

This example illustrates the effect of reacting sulfomethylated, cross-linked resin dispersants with urea or ammonia.

A number of 5 mole sulfomethylated resins were made according to the procedures of Example 1. They were reacted with ammonia or urea and evaluated as dye dispersants in the standard solution prepared in Example 2. Runs 12–14 were not cross-linked with formaldehyde. In runs 12–13 ammonia was added to the sulfomethylated resin dispersant and boiled for 50 minutes. In run 4 urea was added and boiled for 15 minutes. Runs 15–18 were cross-linked with formaldehyde at 95° C. for 90 minutes, run 17 for 3.5 hours, and then reacted with urea.

TABLE III

| Run No. | Agent, moles/1,000 grams of resin | Dispersion test | Heat stability | Foaming, ml. of foam[a] | | | |
|---|---|---|---|---|---|---|---|
| | | | | pH 9.5 | | pH 7.0 | |
| | | | | Initial | min. | Initial | min. |
| 12 | 2.5—NH$_3$ | Exc | 0.1405 | 40 | (30) | 40 | 7 |
| 13 | 5.0—NH$_3$ | Exc | 0.0100 | 35 | (33) | 50 | 14 |
| 14 | 0.68—urea | Exc | 0.0774 | 40 | (18) | 35 | (39) |
| 15 | 1.35—urea | Exc | 0.0174 | 45 | 8 | 55 | 12 |
| 16 | 2.7—urea | Exc | 0.2765 | 30 | (9) | 45 | (60) |
| 17 | 1.35—urea | Exc | 0.0327 | 50 | 10 | 60 | 20 |
| 18 | 1.5—urea | Good | 0.1863 | 35 | 4 | 42 | 8 |

[a] Numbers in parentheses represent seconds required for foam to break.

The results show that the sulfomethylated resin dispersing agents treated with urea or ammonia produces dyestuff dispersions possessing good heat stability under conditions of high temperature and pressure.

EXAMPLE 5

A sulfomethylated resin dispersant from Example 1 was mixed with 5% by weight of a commercial sulfomethylated lignin dyestuff dispersing agent (REAX™ 80A, by Westvaco Corporation) and tested as a dye dispersant in run 19.

TABLE IV

| Run No. | Dispersion test | Heat stability | Foaming test,—ml. of foam at pH 7.0 | | |
|---|---|---|---|---|---|
| | | | Initial | 1 min. | 2 min. |
| 5[a] | Exc | 0.6893 | 60 | 10 | 8 |
| REAX 80A | Exc | 0.0500 | 50 | 8 | 4 |
| 19[b] | Exc | 0.0333 | 50 | 28 | 14 |

[a] From Example 2.
[b] Average of three samples.

Run 19 shows a synergistic improvement in heat stability obtained by the combination of dispersants.

While the invention has been described and illustrated herein by reference to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. A dyestuff composition comprising, a disperse or vat dye cake and from 1% to 75% by weight of dispersant on said dyestuff composition, said dispersant being a water - soluble, sulfomethylated phenolicformaldehyde resin, said resin containing from 1 to 13 moles of sulfomethylation per 1000 grams of starting resin, being crosslinked to a molecular weight of between 500 and 30,000, and said resin being stabilized with 0.5 to 7.5 moles per 1000 grams of said sulfomethylated, cross-linked resin with a member of the group consisting of urea and ammonia.

2. The composition according to claim 1 wherein said resin dispersant contains from 2 to 6 moles of sulfomethylation per 1000 grams of starting resin.

References Cited

UNITED STATES PATENTS 2,090,511  8/1937  Crossley et al. _____ 8—6
2,181,800  11/1939  Crossley et al. _____ 8—79
2,320,678  6/1943  Tassel _____ 260—49

OTHER REFERENCES

Organic Chemistry, Fieser and Fieser, pub. by Reinhold Pub. Co., N.Y., 1956, p. 869.

HERBERT B. GUYNN, Primary Examiner

B. H. HESS, Assistant Examiner

U.S. Cl. X.R.

8—89, 173